United States Patent Office 3,745,161
Patented July 10, 1973

3,745,161
PHENYL-HYDROXY-PYRAZINE CARBOXYLIC
ACIDS AND DERIVATIVES
Tsung-Ying Shen, Gordon L. Walford, and Bruce E.
Witzel, Westfield, N.J., assignors to Merck & Co., Inc.,
Rahway, N.J.
No Drawing. Continuation-in-part of application Ser. No.
836,647, June 25, 1969. This application Apr. 20, 1970,
Ser. No. 30,294
Int. Cl. C07d 51/76
U.S. Cl. 260—250 R                              7 Claims

ABSTRACT OF THE DISCLOSURE

Aryl pyrazine and pyrimidine carboxylic acids and their derivatives are described and the processes for preparing the same are disclosed. These compounds exhibit anti-inflammatory properties and also possess an effective degree of anti-pyretic and analgesic activity.

CROSS REFERENCE TO RELATED APPLICATIONS

This application is a continuation-in-part of our co-pending U.S. application Ser. No. 836,647 filed June 25, 1969, now Pat. No. 3,660,403.

SUMMARY OF THE INVENTION

This invention describes aryl pyrazine and pyrimidine carboxylic acids and their derivatives, processes for preparing the same, and the method of treatment of these compounds as medicinal agents. The disclosed class of compounds in this invention exhibit anti-inflammatory properties and are effective for the prevention and inhibition of edema and granuloma tissue formation.

BACKGROUND OF THE INVENTION

Despite all the research carried on in the development of anti-inflammatory drugs in the past two decades, our knowledge of inflammation remains largely descriptive and we still have little progress; however, we have seen the growth of a great many new drugs. Most of these have been steroids of the 11-oxygenated pregnane series. These, while effective, are complex in structure. There is a need in the market for equally effective compounds of simpler structure.

We have found that the aryl pyrazine and pyrimidine acids of this invention are effective non-steroidal anti-inflammatory agents.

DESCRIPTION AND PREFERRED EMBODIMENTS

This invention relates to new chemical compounds which contain an aryl or substituted aryl radical attached to a pyrazine or a pyrimidine ring bearing a carboxylic acid group and a hydroxy group which are ortho to each other and one of which is para to the aryl radical. This invention further relates to the non-toxic pharmaceutically acceptable salts, esters and amides of these carboxylic acids. Included also in this invention are the methods of preparation and treatment as medicinal agents for the disclosed compounds.

The scope of this invention embraces the following types of compounds:

(A) 2-aryl-5-hydroxy-4-pyrimidine carboxylic acid
(B) 2-aryl-4-hydroxy-5-pyrimidine carboxylic acid
(C) 2-aryl-5-hydroxy-6-pyrazine carboxylic acid
(D) 2-aryl-6-hydroxy-5-pyrazine carboxylic acid The compounds of this invention may be described by the following general Formulas I and II:

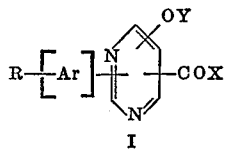 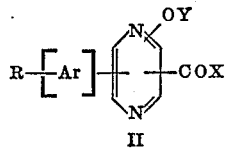

I  II where
—COX and —OY are ortho to each other and [Ar] is para to either —COX or —OY; and where
[Ar] is any benzenoid or non-benzenoid aromatic-like structure (preferably phenyl, styryl, naphthyl, etc.) containing one or more R substituents which may be at any position on the ring (preferably at the 4-position);
R is hydrogen, alkyl (preferably lower alkyl such as methyl, ethyl, propyl, i-propyl, etc.), alkenyl (preferably lower alkenyl such as vinyl, allyl, etc.), halogen (preferably fluoro and chloro), haloalkyl (preferably haloloweralkyl such as trifluoromethyl), hydroxy, alkoxy (preferably lower alkoxy such as methoxy, ethoxy, etc.), acyloxy, nitro, amino, alkylamino (preferably lower alkylamino such as methylamino, ethylamino, etc.), dialkylamino (preferably dilower alkylamino such as dimethylamino, methylethylamino, etc.), acylamino (preferably acetamido, benzoylamino, etc.), mercapto, alkylthio (preferably lower alkylthio such as methylthio, ethylthio, etc.), alkylsulfonyl (preferably lower alkylsulfonyl such as methylsulfonyl), alkylsulfinyl (preferably lower alkylsulfinyl such as methylsulfinyl), sulfonamido or sulfinylamido,
X is hydroxy, amino, alkylamino (preferably lower alkylamino such as methylamino, ethylamino, etc.), dialkylamino (preferably dilower alkylamino such as dimethylamino, methylethylamino, etc.), cycloalkylamino, N-heterocyclo (preferably N-piperidino, N-morpholino, N-piperazino, N-homopiperazino, N-pyrrolidino, etc.), alkoxy (preferably lower alkoxy such as methoxy, ethoxy, etc.), and OM, where M in general is any base which will form an acid addition salt with a carboxylic acid and whose pharmaceutical properties will not cause an adverse physiological effect when ingested by the body system [preferably an alkali, or alkaline earth metal (such as sodium, potassium, calcium, and magnesium) or aluminum];
and
Y is hydrogen, alkyl (preferably lower alkyl such as methyl, ethyl, propyl i-propyl, butyl, s-butyl, t-butyl, etc.), alkenyl (preferably lower alkenyl such as allyl, vinyl, methallyl, etc.), aralkyl (preferably benzyl or phenethyl), aryl (preferably phenyl), acyl (preferably acetyl, propionyl, benzoyl, etc.), and alkoxy carbonyl (preferably lower alkoxy carbonyl such as methoxy carbonyl, ethoxy carbonyl, etc.), with the proviso that R and Y cannot both be hydrogen when X is OH.

It will further be appreciated by one skilled in the art that the following radicals may be employed in the practice of the invention;
where
R is aminoalkyl (preferably aminoloweralkyl such as aminomethyl, aminoethyl, etc.), alkylaminoalkyl (preferably loweralkylaminoloweralkyl, such as methylaminomethyl, ethylaminomethyl, etc.), hydroxyalkyl (preferably hydroxyloweralkyl such as hydroxymethyl, hydroxyethyl, hydroxypropyl, etc.), alkoxyalkyl (preferably loweralkoxyloweralkyl such as methoxymethyl, methoxyethyl, ethoxyethyl, ethoxypropyl, etc.), mercaptoalkyl (preferably mercaptoloweralkyl such as mercaptomethyl, mercaptoethyl, etc.), alkylmercaptoalkyl (preferably loweralkylmercaptoloweralkyl such as methylmercaptomethyl, ethylmercaptoethyl, ethylmercaptopropyl, etc.), cyano, carboxy, carboalkoxy (carbomethoxy, carboethoxy, etc.), carbamyl, aryl (such as phenyl, tolyl, etc.), aralkyl (such as benzyl, phenethyl, etc.), aryloxy, aralkoxy, and acyl, and X is hydroxyloweralkoxy, loweralkoxyloweralkoxy, diloweralkylaminoloweralkoxy, aralkoxy (such as benzyloxy, phenethoxy, etc.), phenoxy, substituted phenoxy, diloweralkylaminoloweralkyl or hydroxyloweralkylamino.

A more preferred aspect of this invention relates to the compounds of Formulas I and II where [Ar] is phenyl or halophenyl; X is —OH, —NH$_2$, dimethylamino, methoxy or ethoxy; and Y is hydrogen or acetyl, with the proviso that R & Y cannot both be hydrogen when X is —OH.

A most preferred aspect of this invention relates to the compounds of Formulae I and II where [Ar] is halophenyl; X is —OH and Y is hydrogen.

Another sub-genus forming an embodiment of this invention is a compound of the formula

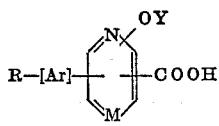

or a non-toxic pharmaceutically acceptable salt thereof, wherein —OY and —COOH are ortho to each other; and wherein [Ar] is phenyl containing one or more R substituents; wherein R is $C_{1-4}$ alkyl, chloro, bromo, fluoro, trifluoromethyl, hydroxy, $C_{1-2}$ alkoxy, nitro, dimethylamino, $C_{1-4}$ alkylthio, or $C_{1-2}$ alkylsulfonyl; and Y is hydrogen or acetyl.

We have found that the compounds of this invention have a useful degree of anti-inflammatory activity and are effective in the treatment of arthritic and dermatological disorders and in like conditions which are responsive to treatment with anti-inflammatory agents. For these purposes, they may be administered orally, topically, parenterally or rectally. Orally, they may be administered in tablets or capsules, the optimum dosage depending, of course, on the particular compound being used and the type and severity of the condition being treated. Although the optimum quantities of the compounds of this invention to be used in such manner will depend on the compound employed and the particular type of disease condition treated, oral dose levels of preferred compounds in the range of 1–100 mg./kg. per day (preferably in the range of 2–50 mg./kg. per day) are useful in control of arthritic conditions, depending on the activity of the specific compound and the reaction sensitivity of the patient. Comparative dosages may be used in topical, parental, or rectal administration.

The compounds of the present invention have further been found to show analgesic, anti-pyretic, diuretic, antifibrinolytic and hypo-glycemic activity and if used for any of the above activities, the same dosage ranges and conditions as discussed above for anti-inflammatory activity will apply.

The arylpyrazine and pyrimidine carboxylic acids of this invention are prepared by the methods below.

(A) 2-aryl-5-hydroxy-4-pyrimidinecarboxylic acid

Reaction of a substituted benzamidine with glyoxal in alkaline solution followed by treatment of the formed glyoxal-amidine addition product with glyoxylic acid in basic medium results in the formation of a 2-aryl-5-hydroxy-4-pyrimidinecarboxylic acid (Example III).

The 2-aryl-5-hydroxy-4-pyrimidinecarboxylic acids can be converted to the corresponding esters and amides by conventional methods. The 5-hydroxy group can also be converted to the desired derivative by conventional methods.

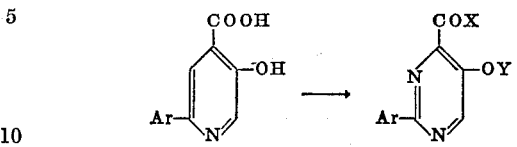

(B) 2-aryl-4-hydroxy-5-pyrimidinecarboxylic acid

When a substituted benzamidine is reacted with a dialkyl piperidylmethylenemalonate in a metal alkoxide medium, the product obtained is an alkyl 2-aryl-4-hydroxy-5-pyrimidinecarboxylate. This is then hydrolyzed in base to the corresponding carboxylic acid (Examples IV).

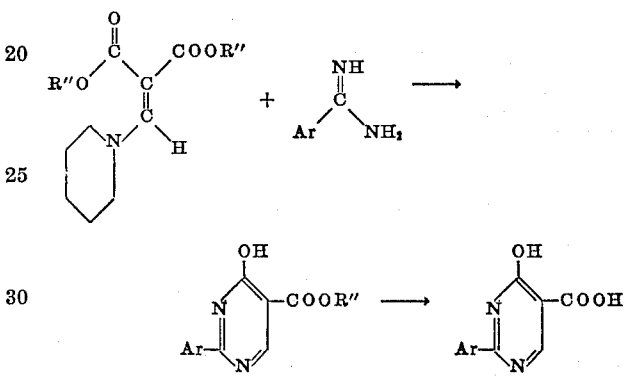

where R" is alkyl.

A further method of preparation is the use of a dialkyl morpholinylmethylenemalonate, dialkyl ethoxymethylenemalonate or alkyl metal-α,γ-dicarboxyglutaconate in place of the dialkyl piperidylmethylenemalonate in the above synthesis.

Aromatic benzamidines when condensed with an alkyl alkoxymethylenecyanoacetate in metal alkoxide media result in 5-cyano-2-aryl-4-hydroxypyrimidines. These are then hydrolyzed to the 2-aryl-4-hydroxy-5-pyrimidine-carboxylic acids by mineral acids. (Example IV).

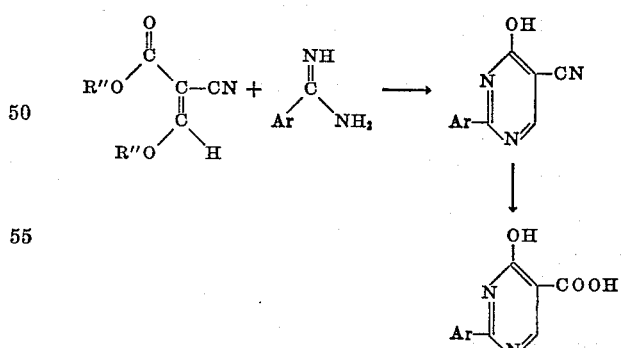

The 2 - aryl - 4 - hydroxy - 5 - pyrimidinecarboxylic acids can be converted to the corresponding esters and amides by conventional methods. The 4-hydroxy group can also be converted to the desired derivative by conventional methods.

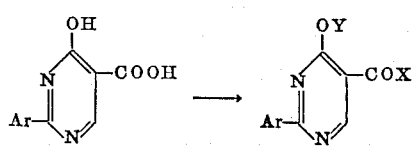

(C) 5-aryl-2-hydroxy-3-pyrazinecarboxylic acid

Condensation of aminomalonamidamidine with aryl glyoxals results in 5-aryl-2-amino-3-pyrazinecarboxamides. Hydrolysis of the amide in base followed by diazotization of the 2-amino group gives the desired 5-aryl-2-hydroxy-3-pyrazinecarboxylic acids (Example I).

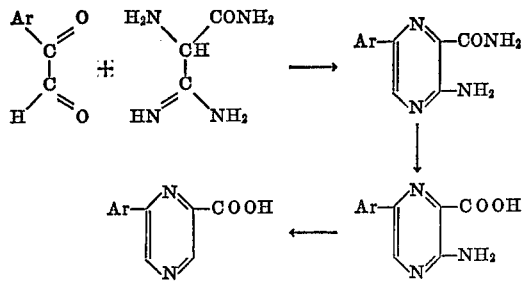

A further method of preparation involves condensation of 2,4,5-triamino-6-hydroxypyrimidine with a 2,2-dihaloacetophenone to form a 2-amio-6-aryl-4-hydroxypteridine. Upon heating at elevated temperatures in a basic medium, the desired 5-aryl-2-hydroxy-3-pyrazinecarboxylic acid is formed (Example I).

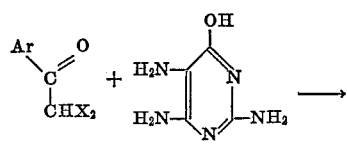

where X is halo

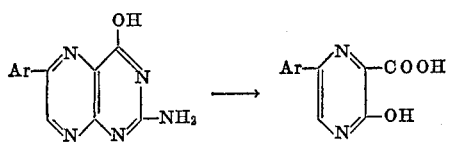

When 5,6-diaminouracil is condensed with 2,2-dihaloacetophenones in the same manner as above, the corresponding 6-aryllumazines are prepared. Heating at raised temperatures in the presence of base results in 5-aryl-2-amino-3-pyrazinecarboxylic acids which are then diazotized to the 5-aryl-2-hydroxy-3-pyrazinecarboxylic acids (Example I).

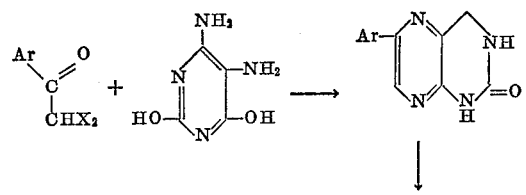

Where X is halo

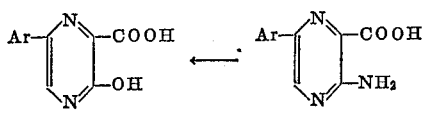

The 5-aryl-2-hydroxy-3-pyrazinecarboxylic acids can be converted to the corresponding esters and amides by conventional methods. The 2-hydroxy group can also be converted to the desired derivative by conventional methods.

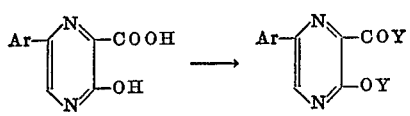

(D) 6-aryl-2-hydroxy-3-pyrazinecarboxylic acid

The preparation of 6-aryl-2-hydroxy-3-pyrazinecarboxylic acids involves condensation of aryl glyoxals with aminomalondiamide. 6-aryl-2-hydroxy-3-pyrazinecarbox-amides are formed, which are then hydrolyzed to the corresponding 6-aryl-2-hydroxy-3-pyrazinecarboxylic acids. (Example II).

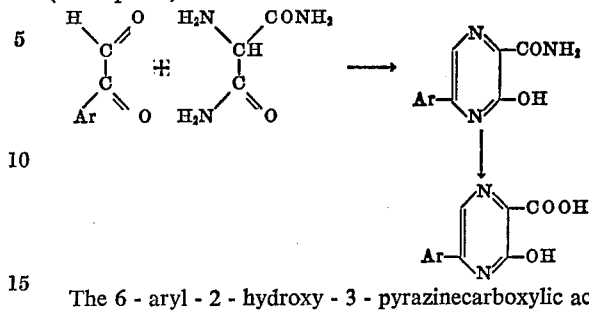

The 6 - aryl - 2 - hydroxy - 3 - pyrazinecarboxylic acids can be converted to the corresponding esters and amides by conventional methods. The 2-hydroxy group can also be converted to the desired derivative by conventional methods.

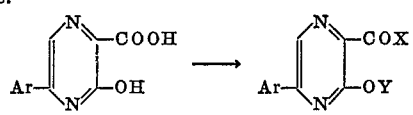

The starting materials of this invention are known.
The following are detailed examples which show the preparation of the various compounds described in this invention. They are to be construed as illustrations of said compounds and not as limitations thereof.

EXAMPLE I 5-aryl-2-hydroxy-3-pyrazine carboxylic acid

EXAMPLE I–1

2-amino-5-(p-fluorophenyl)-3-pyrazinecarboxamide

To a solution of aminomalonamidamidine dihydrochloride (7.5 g., 0.04 mole) in ice-cold water (250 ml.) is added a solution of p-fluorophenylglyoxal (prepared by the procedure outlined in C.A. 49:6956d; and 52:1095b) (7.0 g., 0.046 mole) in ice-cold water (150 ml.). The resulting solution is kept at 0–5° by means of an ice-bath, while ammonium hydroxide is added, with stirring, until the pH reaches 8–9. Additional ammonium hydroxide is added as required to maintain pH 8–9 during the next 30 minutes. The mixture is then stirred overnight at room temperature.

The precipitate of 2 - amino - 5-(p-fluorophenyl)-3-pyrazinecarboxamide is collected by filtration, and purified by recrystallization from ethanol.

When p-fluorophenylglyoxal in the preceding example is replaced by any of the aryl glyoxals of Table I below, the corresponding 2 - amino - 5 - aryl - 3-pyrazinecarboxamide of Table II below is obtained.

TABLE I p-bromophenylglyoxal
p-chlorophenylglyoxal
m-nitrophenylglyoxal
p-nitrophenylglyoxal
o-hydroxyphenylglyoxal
p-methylphenylglyoxal
p-methoxyphenylglyoxal
3-hydroxy-4-methoxyphenylglyoxal
3,5-dimethoxyphenylglyoxal
p-butylphenylglyoxal
2,4-dimethylphenylglyoxal
p-dimethylaminophenylglyoxal
3,4-diethoxyphenylglyoxal
2-chloro-4-methylphenylglyoxal
p-trifluoromethylphenylglyoxal
p-cyanophenylglyoxal
p-(butylthio)phenylglyoxal
p-(ethylsulfonyl)phenylglyoxal
p-phenoxyphenylglyoxal
p-benzylphenylglyoxal
p-phenethylphenylglyoxal

TABLE II 2-amino-5-(p-bromophenyl)-3-pyrazinecarboxamide
2-amino-5-(p-chlorophenyl)-3-pyrazinecarboxamide
2-amino-5-(m-nitrophenyl)-3-pyrazinecarboxamide
2-amino-5-(p-nitrophenyl)-3-pyrazinecarboxamide
2-amino-5-(o-hydroxyphenyl)-3-pyrazinecarboxamide
2-amino-5-(p-methylphenyl)-3-pyrazinecarboxamide
2-amino-5-(p-methoxyphenyl)-3-pyrazinecarboxamide
2-amino-5-(3-hydroxy-4-methoxyphenyl)-3-pyrazinecarboxamide
2-amino-5-(3,5-dimethoxyphenyl)-3-pyrazinecarboxamide
2-amino-5-(p-butylphenyl)-3-pyrazinecarboxamide
2-amino-5-(2,4-dimethylphenyl)-3-pyrazinecarboxamide
2-amino-5-(p-dimethylaminophenyl)-3-pyrazinecarboxamide
2-amino-5-(3,4-diethoxyphenyl)-3-pyrazinecarboxamide
2-amino-5-(2-chloro-4-methylphenyl)-3-pyrazinecarboxamide
2-amino-5-(p-trifluoromethylphenyl)-3-pyrazinecarboxamide
2-amino-5-(p-cyanophenyl)-3-pyrazinecarboxamide
2-amino-5-[p-(butylthio)phenyl]-3-pyrazinecarboxamide
2-amino-5-[p-methylsulfonyl)phenyl]-3-pyrazinecarboxamide
2-amino-5-(p-phenoxyphenyl)-3-pyrazinecarboxamide
2-amino-5-(p-benzylphenyl)-3-pyrazinecarboxamide
2-amino-5-(p-phenethylphenyl)-3-pyrazinecarboxamide

EXAMPLE I-2

2-amino-5-(p-fluorophenyl)-3-pyrazinecarboxylic acid

A suspension of 2-amino-5-(p-fluorophenyl)-3-pyrazinecarboxamide (3.5 g., 0.0015 mole) in 1 N sodium hydroxide (200 ml.) is heated under reflux for 8 hours. The resulting clear solution is adjusted to pH 3 with concentrated hydrochloric acid, giving 2 - amino - 5-(p-fluorophenyl) - 3 - pyrazinecarboxylic acid as a solid precipitate. The solid is collected by filtration, and recrystallized from aqueous alcohol.

When the 2 - amino - 5 - aryl-3-pyrazinecarboxamides of Example I-1 replace 2 - amino-5-(p-fluorophenyl)-3-pyrazinecarboxamide in the above example, the corresponding 2 - amino - 5 - aryl-3-pyrazinecarboxylic acids are obtained (except in the case of 2-amino-5-(p-cyanophenyl) - 3 - pyrazinecarboxamide, from which 2-amino-4 - (p-carboxyphenyl)-3-pyrazinecarboxylic acid is obtained).

EXAMPLE I-3

5-(p-fluorophenyl)-2-hydroxy-3-pyrazinecarboxylic acid

A solution of 2-amino-5-(p-fluorophenyl)-3-pyrazinecarboxylic acid (560 mg., 2.4 mmoles) in cold concentrated sulfuric acid (15 ml.), is treated with a solution of sodium nitrite (250 mg., 3.6 mmoles) in cold concentrated sulfuric acid (5 ml.). The resulting solution is held at 0° for 4 hours, at room temperature for 4 hours, and then poured onto ice. The mixture is stirred overnight at room temperature and filtered. The collected solid, 5-(p-fluorophenyl) - 2 - hydroxy - 3 - pyrazinecarboxylic acid, is dried and then purified by recrystallization from aqueous alcohol.

When the 2-amino-5-aryl-3-pyrazinecarboxylic acids of Example I-2 are used in place of 2-amino-5-(p-fluorophenyl)-3-pyrazinecarboxylic acid in the above example, the corresponding 5-aryl-2-hydroxy-3-pyrazinecarboxylic acids of Table III below are obtained.

TABLE III 5-(p-bromophenyl)-2-hydroxy-3-pyrazinecarboxylic acid
5-(p-chlorophenyl)-2-hydroxy-3-pyrazinecarboxylic acid
5-(m-ntirophenyl)-2-hydroxy-3-pyrazinecarboxylic acid
5-(p-nitrophenyl)-2-hydroxy-3-pyrazinecarboxylic acid
5-(o-hydroxyphenyl)-2-hydroxy-3-pyrazinecarboxylic acid
5-(p-methylphenyl)-2-hydroxy-3-pyrazinecarboxylic acid
5-(p-methoxyphenyl)-2-hydroxy-3-pyrazinecarboxylic acid
5-(3-hydroxy-4-methoxyphenyl)-2-hydroxy-3-pyrazinecarboxylic acid
5-(3,5-dimethoxyphenyl)-2-hydroxy-3-pyrazinecarboxylic acid
5-(p-butylphenyl)-2-hydroxy-3-pyrazinecarboxylic acid
5-(2,4-dimethylphenyl)-2-hydroxy-3-pyrazinecarboxylic acid
5-(p-dimethylaminophenyl)-2-hydroxy-3-pyrazinecarboxylic acid
5-(3,4-diethoxyphenyl)-2-hydroxy-3-pyrazinecarboxylic acid
5-(2-chloro-4-methylphenyl)-2-hydroxy-3-pyrazinecarboxylic acid
5-(p-trifluoromethylphenyl)-2-hydroxy-3-pyrazinecarboxylic acid
5-(p-carboxyphenyl)-2-hydroxy-3-pyrazinecarboxylic acid
5-[p-(butylthio)phenyl]-2-hydroxy-3-pyrazinecarboxylic acid
5-[p-(ethylsulfonyl)phenyl]-2-hydroxy-3-pyrazinecarboxylic acid
5-(p-phenoxyphenyl)-2-hydroxy-3-pyrazinecarboxylic acid
5-(p-benzyphenyl)-2-hydroxy-3-pyrazinecarboxylic acid
5-(p-phenylethylphenyl)-2-hydroxy-3-pyrazinecarboxylic acid

EXAMPLE I-4

2-amino-6-(p-fluorophenyl)-4-hydroxypteridine

A solution of 2,4,5-triamino-6-hydroxypyrimidine dihydrochloride (4.5 g., 0.021 mole) in 50% aqueous ethanol (80 ml.) is treated with sodium acetate (13.5 g.) and 2,2-dichloro-4'-fluoroacetophenone (4.1 g., 0.020 mole). The mixture is heated under reflux for 1½ hours. 2-amino-6-(p-fluorophenyl)-4-hydroxypteridine separates as a crystalline solid on cooling. It is purified by dissolution in warm 2 N sodium hydroxide, filtration, and acidification of the filtrate to pH 2.

When the following substituted 2,2-dihaloacetophenones of Table IV below are used in the above example in place of 2,2-dichloro-4'-fluoroacetophenone, the corresponding 2-amino-6-aryl-4-hydroxypteridines of Table V below are obtained.

TABLE IV 2,2-dichloro-4'-bromoacetophenone
2,2-dichloro-2',4'-dibromoacetophenone
2,2-dichloro-pentafluoroacetophenone
2,2-2',4',5'-pentachloroacetophenone
2,2-dichloro-4'-phenylacetophenone
2,2-dichloro-4'-chloroacetophenone
2,2-dichloro-4'-methylacetophenone
2,2-dichloro-3',5'-dinitroacetophenone
2,2-dichloro-4'-methoxyacetophenone
2,2-dichloro-4'-(methylsulfonyl)acetophenone
2,2-dichloro-4'-t-butylacetophenone
2,2-dichloro-4'-hydroxyacetophenone
2,2-dichloro-2'-hydroxyacetophenone
2,2-dichloro-4'-trifluoromethylacetophenone
2,2-dichloro-4'-(methylthio)acetophenone
2,2-dichloro-2'-nitroacetophenone
2,2-dichloro-3'-nitroacetophenone
2,2-dichloro-4'-nitroacetophenone
2,2-dichloro-4'-phenethylacetophenone
2,2-3',4'-tetrachloroacetophenone
2,2-dichloro-4'-phenoxyacetophenone
2,2-dichloro-4'-benzylacetophenone

TABLE V 2-amino-6-(4-bromophenyl)-4-hydroxypteridine
2-amino-6-(2,4-dibromophenyl)-4-hydroxypteridine
2-amino-6-(pentafluorophenyl)-4-hydroxypteridine 2-amino-6-(2,4,5-trichlorophenyl)-4-hydroxypteridine
2-amino-6-(4-biphenylyl)-4-hydroxypteridine
2-amino-6-(4-chlorophenyl)-4-hypdroxypteridine
2-amino-6-(4-methylphenyl)-4-hydroxypteridine
2-amino-6-(3,5-dinitrophenyl)-4-hydroxypteridine
2-amino-6-(4-methoxyphenyl)-4-hydroxypteridine
2-amino-6-[4-(methylsulfonyl)phenyl]-4-hydroxypteridine
2-amino-6-(4-t-butylphenyl)-4-hydroxypteridine
2-amino-6-(4-hydroxyphenyl)-4-hydroxypteridine
2-amino-6-(2-hydroxyphenyl)-4-hydroxypteridine
2-amino-6-(4-trifluoromethylphenyl)-4-hydroxypteridine
2-amino-6-[4-(methylthio)phenyl]-4-hydroxypteridine
2-amino-6-(2-nitrophenyl)-4-hydroxypteridine
2-amino-6-(3-nitrophenyl)-4-hydroxypteridine
2-amino-6-(4-nitrophenyl)-4-hydroxypteridine
2-amino-6-(4-phenethylphenyl)-4-hydroxypteridine
2-amino-6-(3,4-dichlorophenyl)-4-hydroxypteridine
2-amino-6-(4-phenoxyphenyl)-4-hydroxypteridine
2-amino-6-(4-benzylphenyl)-4-hydroxypteridine 2,4,5-triamino-6-hydroxypyrimidine may be replaced in the above example by 5,6-diaminouracil, which, with the substituted 2,2-dihaloacetophenones of Table IV above, gives the corresponding 6-aryllumazines.

EXAMPLE I-5

5-(p-fluorophenyl)-2-hydroxy-3-pyrazinecarboxylic acid 2-amino-6-(p-fluorophenyl)-4-hydroxypteridine (3.3 g., 0.013 mole) is heated in an autoclave with 4 N sodium hydroxide (32 ml.) at 170° for 24 hours. The solution is diluted with water (32 ml.), heated to boiling, filtered, and acidified to pH 2. The precipitated 5-(p-fluorophenyl)-2-hydroxy-3-pyrazinecarboxylic acid is collected by filtration and recrystallized from aqueous alcohol.

When the 2-amino-6-aryl-4-hydroxypteridines or 6-aryllumazines of Example I-4 are used in place of 2-amino-6-(p-fluorophenyl)-4-hyroxypteridine in the above example, the corresponding 5 - aryl-2-hydroxy-3-pyrazinecarboxylic acids or 5 - aryl-2-amino-3-pyrazinecarboxylic acids, respectively, are obtained. The latter may be converted to the corresponding 5-aryl-2-hydroxy-3-pyrazinecarboxylic acids by the method of Example I-3. The products obtained are listed in Table VI below.

TABLE VI 5-(4-bromophenyl-2-hydroxy-3-pyrazinecarboxylic acid
5-(2,4-dibromophenyl)-2-hydroxy-3-pyrazinecarboxylic acid
5-(pentafluorophenyl)-2-hydroxy-3-pyrazinecarboxylic acid
5-(2,4,5-trichlorophenyl)-2-hydroxy-3-pyrazinecarboxylic acid
5-(4-biphenyl)-2-hydroxy-3-pyrazinecarboxylic acid
5-(4-chlorophenyl)-2-hydroxy-3-pyrazinecarboxylic acid
5-(4-methylphenyl)-2-hydroxy-3-pyrazinecarboxylic acid
5-(3,5-dinitrophenyl)-2-hydroxy-3-pyrazinecarboxylic acid
5-(4-methoxyphenyl)-2-hydroxy-3-pyrazinecarboxylic acid
5-[4-methylsulfonyl)phenyl]-2-hydroxy-3-pyrazinecarboxylic acid
5-(4-t-butylphenyl)-2-hyroxy-3-pyrazinecarboxylic acid
5-(4-methylphenyl)-2-hydroxy-3-pyrazinecarboxylic acid
5-(2-hydroxyphenyl)-2-hydroxy-3-pyrazinecarboxylic acid
5-(4-trifluoromethylphenyl)-2-hydroxy-3-pyrazinecarboxylic acid
5-[4-(methylthio)phenyl]-2-hydroxy-3-pyrazinecarboxylic acid
5-(2-nitrophenyl)-2-hydroxy-3-pyrazinecarboxylic acid
5-(3-nitrophenyl)-2-hydroxy-3-pyrazinecarboxylic acid
5-(4-nitrophenyl)-2-hydroxy-3-pyrazinecarboxylic acid
5-(4-phenethylphenyl)-2-hydroxy-3-pyrazinecarboxylic acid
5-(3,4-dichlorophenyl)-2-hydroxy-3-pyrazinecarboxylic acid
5-(4-phenoxyphenyl)-2-hydroxy-3-pyrazinecarboxylic acid
5-(4-benzylphenyl)-2-hydroxy-3-pyrazinecarboxylic acid

EXAMPLE II 6-aryl-2-hydroxy-3-pyrazinecarboxylic acid

EXAMPLE II-1

6-(p-fluorophenyl)-2-hydroxy-3-pyrazinecarboxamide p-Fluorophenylglyoxal (5.4 g., 0.035 mole) in water (25 ml.) is treated with aqueous sodium bisulfite (d. 1.34; 50 ml.), and the mixture is stirred for 45 minutes at room temperature. Aminoalondiamide (3.9 g., 0.033 mole) in water (30 ml.) is added, and the mixture is warmed for 2½ hours on the steam bath. A crystalline precipitate of 6 - (p - fluorophenyl)-2-hydroxy-3-pyrazinecarboxaxmide separates, and is collected by filtration, washed with water and ethanol, and dried. The compound is purified by recrystallization from ethanol.

When the aryl glyoxals of Example I-1 (Table I) are used in place of p-fluorophenylglyoxal in the preceding example, the corresponding 6-aryl-2-hydroxy-3-pyrazinecarboxamides are obtained.

EXAMPLE II-2

6-(p-fluorophenyl)-2-hydroxy-3-pyrazinecarboxylic acid

6 - (p-fluorophenyl)-2-hydroxy-3-pyrazinecarboxamide (3.7 g., 0.016 mole), sodium hydroxide (4.0 g., 0.10 mole), and ethanol (140 ml.) are heated in a steel bomb at 150° for 16 hours. After cooling, water (200 ml.) is added, and the ethanol removed by evaporation in vacuo. The alkaline aqueous reaction mixture is then heated to boiling, filtered hot by gravity, and the filtrate acidified to pH 4 with concentrated hydrochloric acid. The precipitate of 6 - (p - fluorophenyl)-2-hydroxy-3-pyrazinecarboxylic acid is collected after chilling, and recrystallized from alcohol.

When the 6-aryl-2-hydroxy-3-pyrazinecarboxamides of Examples II-1 are used in place of 6-(p-fluorophenyl)-2-hydroxy-3-pyrazinecarboxamide in the above example, the corresponding 6 - aryl - 2-hydroxy-3-pyrazinecarboxylic acids of Table VII below are obtained.

TABLE VII 6-(p-bromophenyl)-2-hydroxy-3-pyrazinecarboxylic acid
6-(p-chlorophenyl)-2-hydroxy-3-pyrazinecarboxylic acid
6-(m-nitrophenyl)-2-hydroxy-3-pyrazinecarboxylic acid
6-(p-nitrophenyl)-2-hydroxy-3-pyrazinecarboxylic acid
6-(o-hydroxyphenyl)-2-hydroxy-3-pyrazinecarboxylic acid
6-(p-methylphenyl)-2-hydroxy-3-pyrazinecarboxylic acid
6-(p-methoxyphenyl)-2-hydroxy-3-pyrazinecarboxylic acid
6-(3-hydroxy-4-methoxyphenyl)-2-hydroxy-3-pyrazine carboxylic acid
6-(3,5-dimethoxyphenyl)-2-hyroxy-3-pyrazinecarboxylic acid
6-(p-butylphenyl)-2-hydroxy-3-pyrazinecarboxylic acid
6-(2,4-dimethylphenyl)-2-hydroxy-3-pyrazinecarboxylic acid
6-(p-dimethylaminophenyl)-2-hydroxy-3-pyrazinecarboxylic acid
6-(3,4-diethoxyphenyl)-2-hydroxy-3-pyrazinecarboxylic acid
6-(2-chloro-4-methylphenyl)-2-hydroxy-3-pyrazinecarboxylic acid
6-(p-trifluoromethylphenyl)-2-hydroxy-3-pyrazinecarboxylic acid
6-(p-carboxyphenyl)-2-hydroxy-3-pyrazinecarboxylic acid
6-(p-phenoxyphenyl)-2-hydroxy-3-pyrazinecarboxylic acid
5-(4-phenoxyphenyl)-2-hydroxy-3-pyrazinecarboxylic acid
5-(4-benzylphenyl)-2-hydroxy-3-pyrazinecarboxylic acid 6-(p-benzylphenyl)-2-hydroxy-3-pyrazinecarboxylic acid
6-(p-phenethylphenyl)-2-hydroxy-3-pyrazinecarboxylic acid

EXAMPLE III 2-aryl-5-hydroxy-4-pyrimidinecarboxylicacid 2-(p-fluorophenyl)-5-hydroxy-4-pyrimidinecarboxylic acid (A) A saturated (below 5°) aqueous solution of p-fluorobenzamidine hydrochloride (prepared by the procedure outlined in C.A. 50:15546) is treated with an equimolar quantity of a 40% aqueous solution of glyoxal, and the solution rendered alkaline to litmus by the addition of aqueous 50% potassium hydroxide. After 15 minutes, the crystalline addition product is collected by filtration, washed thoroughly with ice-water, and dried in vacuo over sulfuric acid.

(B) A solution of the glyoxal-amidine addition product in ethanol (50 ml./g.) is treated with a 10–20% excess of glyoxylic acid and with aqueous 50% potassium hydroxide (5 ml./g.). The flask is tightly stoppered, and allowed to stand for several days at room temperature.

The solution is made slightly acid with acetic acid, and the precipitated 2 - (p-fluorophenyl)-5-hydroxy-4-pyrimidinecarboxylic acid collected by filtration. The product is purified by recrystallization from aqueous ethanol.

When the aromatic amidines of Table VIII below are used in place of p-fluorobenzamidine in the preceding example, the corresponding 2-aryl-5-hydroxy-4-pyrimidine-carboxylic acids of Table IX below are obtained.

TABLE VIII o-chlorobenzamidine
p-chlorobenzamidine
m-nitrobenzamidine
p-nitrobenzamidine
3,4-dimethylbenzamidine
p-dimethylaminobenzamidine
p-(methylsulfonyl)benzamidine
3,5-dibromobenzamidine
2,6-dichlorobenzamidine
3,4,5-trimethoxybenzamidine
p-(butylthio)benzamidine
p-(methylthio)benzamidine
p-phenoxybenzamidine

TABLE IX 2-(o-chlorophenyl)-5-hydroxy-4-pyrimidinecarboxylic acid
2-(p-chlorophenyl)-5-hydroxy-4-pyrimidinecarboxylic acid
2-(m-nitrophenyl)-5-hydroxy-4-pyrimidinecarboxylic acid
2-(p-nitrophenyl)-5-hydroxy-4-pyrimidinecarboxylic acid
2-(p-dimethylaminophenyl)-5-hydroxy-4-pyrimidine-carboxylic acid
2-[p-methylsulfonyl)phenyl]-5-hydroxy-4-pyrimidine-carboxylic acid
2-(3,5-dibromophenyl)-5-hydroxy-4-pyrimidinecarboxylic acid
2-(2,6-dichlorophenyl)-5-hydroxy-4-pyrimidinecarboxylic acid
2-(3,4,5-trimethoxyphenyl)-5-hydroxy-4-pyrimidine-carboxylic acid
2-[p-methylthio)phenyl]-5-hydroxy-4-pyrimidinecarboxylic acid
2-(p-phenoxyphenyl)-5-hydroxy-4-pyrimidinecarboxylic acid

EXAMPLE IV 2-aryl-4-hydroxy-5-pyrimidinecarboxylic acid

EXAMPLE IV–1

Ethyl 2-(p-fluorophenyl)-4-hydroxy-5-pyrimidinecarboxylate

A solution of sodium (1.38 ., 0.06 g.-atom) in absolute ethanol (100 ml.) is treated with p-fluorobenzamidine hydrochloride (7.0 g., 0.04 mole) and diethyl piperidylmethylenemalonate [prepared by the procedure outlined by A. A. Santilli, W. F. Bruce and T. S. Osdene, J. Med. Chem., 7, 68 (1964)] (5.1 g., 0.02 mole). The reaction mixture is then heated under reflux with stirring for 2 hours.

The mixture is filtered, ethanol removed from the filtrate by evaporation in vacuo, and the residue acidified with acetic acid. The precipitated ethyl 2-(p-fluorophenyl)-4-hydroxy-5-pyrimidinecarboxylate is collected by filtration, and purified by recrystallization from ethanol.

When the aromatic amidines of Example III (Table VIII) are used in place of p-fluorobenzamidine in the above example, the corresponding 2-aryl-5-carboethoxy-4-hydroxypyrimidines are obtained.

Diethyl piperidylmethylenemalonate may be replaced in the above example by diethyl morpholinylmethylenemalonate (prepared by the procedure of A. A. Santilli, et al.), diethyl ethoxymethylenemalonate, or ethyl sodio-α,γ-dicarboxyglutaconate. [The latter compounds prepared by the procedure outlined by P. C. Mitten and J. C. Bardhan, J. Chem. Soc., 123, 2179 (1923).]

EXAMPLE IV–2

2-(p-fluorophenyl)-4-hydroxy-5-pyrimidinecarboxylic acid

Ethyl 2 - (p-fluorophenyl)-4-hydroxy-5-pyrimidinecarboxylate (2.6 g., 0.01 mole) is treated with a solution of potassium hydroxide (0.7 g., 0.0125 mole) in alcohol (12.5 ml.) for 5 hours under reflux.

The solution is then evaporated to dryness in vacuo, and the residue taken up in water (25 ml.). The aqueous solution is filtered, the filtrate acidified with hydrochloric acid, and the precipitated 2-(p-fluorophenyl)-4-hydroxy-5-pyrimidinecarboxylic acid collected by filtration and washed thoroughly with water. The product is purified by recrystallization from alcohol.

When the 2-aryl-5-carboethoxy-4-hydroxy-5-pyrimidines of Example IV–1 are used in the above example in place of ethyl 2-(p-fluorophenyl)-4-hydroxy-5-pyrimidinecarboxylate, the corresponding 2-aryl-4-hydroxy-5-pyrimidinecarboxylic acids of Table X below are obtained.

TABLE X 2-(o-chlorophenyl)-4-hydroxy-5-pyrimidinecarboxylic acid
2-(p-chlorophenyl)-4-hydroxy-5-pyrimidinecarboxylic acid
2-(m-nitrophenyl)-4-hydroxy-5-pyrimidinecarboxylic acid
2-(p-nitrophenyl)-4-hydroxy-5-pyrimidinecarboxylic acid
2-(3,4-dimethylphenyl)-4-hydroxy-5-pyrimidinecarboxylic acid
2-(p-dimethylaminophenyl)-4-hydroxy-5-pyrimidinecarboxylic acid
2-[p-methylsulfonyl)phenyl]-4-hydroxy-5-pyrimidinecarboxylic acid
2-(3,5-dibromophenyl)-4-hydroxy-5-pyrimidinecarboxylic acid
2-(2,6-dichlorophenyl)-4-hydroxy-5-pyrimidinecarboxylic acid
2-(3,4,5-trimethoxyphenyl)-4-hydroxy-5-pyrimidinecarboxylic acid 2-[p-(butylthio)phenyl]-4-hydroxy-5-pyrimidinecarboxylic acid 2-[p-(methylthio)phenyl]-4-hydroxy-5-pyrimidinecarboxylic acid 2-(p-phenoxyphenyl)-4-hydroxy-5-pyrimidinecarboxylic acid

EXAMPLE IV-3

5-cyano-2-(p-fluorophenyl)-4-hydroxypyrimidine

A solution of sodium (805 mg., 0.035 g.-atom) in absolute ethanol (100 ml.) is treated first with p-fluorobenzamidine hydrochloride (2.4 g., 0.014 mole), and then, after a few minutes, with ethyl ethoxymethylenecyanoacetate (2.4 g., 0.014 mole). The reaction mixture is heated under reflux with stirring for 2 hours, and then allowed to stand overnight at room temperature.

Water (50 ml.) is added, and the mixture neutralized with acetic acid. The precipitate of 5-cyano-2-(p-fluorophenyl)-4-hydroxypyrimidine is collected by filtration and purified by dissolution in concentrated ammonium hydroxide, followed by acidification with acetic acid.

When the aromatic amidines of Example III (Table VIII) are used in place of p-fluorobenzamidine in this example, the corresponding 2-aryl-5-cyano-4-hydroxypyrimidines are obtained.

EXAMPLE IV-4

2-(p-fluorophenyl)-4-hydroxy-5-pyrimidinecarboxylic acid

A mixture of 5-cyano-2-(p-fluorophenyl)-4-hydroxypyrimidine (2.2 g., 0.01 mole) and concentrated hydrochloric acid (10 ml.) is heated under reflux for 3 hours. It is then allowed to cool, and poured on cracked ice (ca. 50 g.). The precipitate is collected by filtration, and washed thoroughly with cold water.

The precipitate is treated with a slight excess of aqueous 10% sodium hydroxide, the solution filtered, and the filtrate acidified with hydrochloric acid giving 2-(p-fluorophenyl)-4-hydroxy-5-pyrimidinecarboxylic acid. The product is collected by filtration, washed with water, and recrystallized from alcohol.

When the 2-aryl-5-cyano-4-hydroxypyrimidines of Example IV-3 are used in place of 5-cyano-2-(p-fluorophenyl)-4-hydroxypyrimidine in the preceding example, the corresponding 2-aryl-4-hydroxy-5-pyrimidinecarboxylic acids of Table X are obtained.

PREPARATION OF ESTERS 4-carbomethoxy-2-(p-fluorophenyl)-5-hydroxypyrimidine

To a mixture of 2-(p-fluorophenyl)-5-hydroxy-4-pyrimidinecarboxylic acid (3.5 g., 0.015 mole) and absolute methanol (4.8 g.≡6.1 ml., 0.15 mole) is added slowly, with stirring, concentrated sulfuric acid (0.6 ml.). The mixture is then heated under reflux for 8 hours.

Excess methanol is removed by evaporation in vacuo, and the residue is treated, with stirring, with ice-water (25 ml.). 4-carbomethoxy-2-(p-fluorophenyl)-5-hydroxypyrimidine is collected by filtration, washed thoroughly with cold water, and dried. It is purified by recrystallization from aqueous alcohol.

When the 2-(p-fluorophenyl)-5-hydroxy-4-pyrimidinecarboxylic acid of the above procedure is replaced by any of the carboxylic acid compounds of this invention, the corresponding methyl ester is prepared.

When the methanol in the above procedure is replaced by other appropriate alcohols such as ethanol, propanol, isopropanol, butanol, isobutanol, t-butanol, 2-methoxyethanol or 2-ethoxyethanol, the corresponding ester is prepared. A representative list of the esters thus prepared is shown below.

Methyl 5-(p-fluorophenyl)-2-hydroxy-3-pyrazinecarboxylate

Methyl 5-(p-fluorophenyl)-2-acetoxy-3-pyrazinecarboxylate

Methyl 5-(p-fluorophenyl)-2-methoxy-3-pyrazinecarboxylate

Propyl 5-(p-methoxyphenyl)-2-hydroxy-3-pyrazinecarboxylate t-Butyl 5-(p-trifluoromethylphenyl)-2-acetoxy-3-pyrazinecarboxylate Methyl 5-(2-nitrophenyl)-2-hydroxy-3-pyrazinecarboxylate t-Butyl 6-(p-fluorophenyl)-2-acetoxy-3-pyrazinecarboxylate Methyl 6-(o-hydroxyphenyl)-2-hydroxy-3-pyrazinecarboxylate 2-Methoxyethyl 6-(2,4-dimethylphenyl)-2-methoxy-3 pyrazinecarboxylate Ethyl 6-[p-(ethylthio)phenyl]-2-hydroxy-3-pyrazinecarboxylate Propyl 2-(p-fluorophenyl)-5-hydroxy-4-pyrimidinecarboxylate 2-Ethoxyethyl 2-(p-fluorophenyl)-5-acetoxy-4-pyrimidinecarboxylate Methyl 2-(3,4,5-trimethoxyphenyl)-5-methoxy-4-pyrimidinecarboxylate i-Propyl 2-(p-fluorophenyl)-4-acetoxy-5-pyrimidinecarboxylate Methyl 2-(p-fluorophenyl)-4-hydroxy-5-pyrimidinecarboxylate t-Butyl 2-(2,6-dichlorophenyl)-4-methoxy-5-pyrimidinecarboxylate Methyl 2-p-dimethylaminophenyl)-4-hydroxy-5-pyrimidinecarboxylate Methyl 2-[p-methylsulfonyl)phenyl]-4-hydroxy-5-pyrimidinecarboxylate

PREPARATION OF ALKOXY DERIVATIVES 2-(p-fluorophenyl)-5-methoxy-4-pyrimidinecarboxylic acid 4-carbomethoxy-2-(p-fluorophenyl) - 5 - hydroxypyrimidine (2.5 g., 0.010 mole), sodium (230 mg., 0.010 g.-atom) in anhydrous methanol (10 ml.), and methyl iodide (1.6 g., 0.011 mole) are heated together under reflux for several hours. Methanol is removed by evaporation in vacuo, and the residue is treated with water (25 ml.). The mixture is rendered alkaline with sodium hydroxide to ensure dissolution of unaltered starting material, and then is extracted with ether (2× 25 ml.). The combined ethereal extracts are dried over anhydrous magnesium sulfate, and evaporated in vacuo to give 4-carbomethoxy-2-(p-fluorophenyl)-5-methoxypyrimidine.

The methoxy ester hydrolyzed with alcoholic potassium hydroxide by the procedure of Example IV-2 gives 2-(p-fluorophenyl)-5-methoxy - 4 - pyrimidinecarboxylic acid.

The procedure outlined in the preceding example may be applied to the preparation of other alkoxy carboxylic acids by substituting the appropriate hydroxy carboxylic acid ester for 4-carbomethoxy-2-(p-fluorophenyl)-5-hydroxypyrimidine, and the appropriate alkyl halide for methyl iodide. A representative list of products is shown below.

2-(p-chlorophenyl)-5-benzyloxy-4-pyrimidinecarboxylic acid 2-(3,4-dimethylphenyl)-5-methoxy-4-pyrimidinecarboxylic acid 2-(2,6-dichlorophenyl)-5-allyloxy-4-pyrimidinecarboxylic acid 2-[p-(methylsulfonyl)phenyl]-5-phenethoxy-4-pyrimidinecarboxylic acid 2-[p-(methylthio)phenyl]-5-methoxy-4-pyrimidinecarboxylic acid 4-ethoxy-2-(p-fluorophenyl)-5-pyrimidinecarboxylic acid (A) Ethyl 4-chloro-2-(p-fluorophenyl)-5-pyrimidine carboxylate 3 - (p-fluorophenyl)-4-hydroxy-5-pyrimidine carboxylic acid (14.3 g., 0.05 mole) is treated with phosphorus oxychloride (20 g., 0.13 mole). To the mixture, finely pulverized phosphorus pentachloride (21 g., 0.10 mole) is added in small portions. Once the evolution of hydrogen chloride has subsided, the mixture is warmed on the steam-bath for 1 hour.

Excess phosphorus oxychloride is removed by evaporation in vacuo, and the residual syrup is poured onto cracked ice (ca. 50 g.). The mixture is extracted with chloroform (3 × 50 ml.), the combined extracts washed with water, dried over anhydrous sodium sulfate, filtered, and evaporated to give ethyl 4-chloro-2-(p-fluorophenyl)-5-pyrimidine carboxylate.

(B) Ethyl 4-ethoxy-2-(p-fluorophenyl)-5-pyrimidine carboxylate

To a solution of sodium (2.3 g., 0.10 g. atom) in absolute ethanol (100 ml.) is added ethyl 4-chloro-2-(p-fluorophenyl)-5-pyrimidine carboxylate (0.015 mole). The solution is refluxed for 1.5 hours. After neutralization by passing dry $CO_2$ gas and centrifugation, the resultant solution is evaporated to dryness under reduced pressure. The residue is taken up in water and extracted with ether. The ethereal layer is washed with water, dried over $Na_2SO_4$, and evaporated. Recrystallization of the residue from aqueous acetone gives ethyl 4-ethoxy-2-(p-fluorophenyl)-5-pyrimidine carboxylate.

(C) 4-ethoxy-2-(p-fluorophenyl)-5-pyrimidine carboxylic acid

The ethoxy ester is hydrolyzed with alcoholic potassium hydroxide by the procedure of Example IV-2 to give 4-ethoxy-2-(p-fluorophenyl)-5-pyrimidine carboxylic acid.

The procedure outlined in the preceding example may be applied to the preparation of other alkoxy carboxylic acids by substituting the appropriate hydroxy carboxylic acid ester. A representative list of the products is shown below.

6-(p-fluorophenyl-2-methoxy-3-pyrazinecarboxylic acid
2-(p-fluorophenyl)-5-methoxy-4-pyrimidinecarboxylic acid
2-(p-fluorophenyl)-4-methoxy-5-pyrimidinecarboxylic acid
5-(p-chlorophenyl)-2-methoxy-3-pyrazinecarboxylic acid
5-(m-nitrophenyl)-2-ethoxy-3-pyrazinecarboxylic acid
5-(p-methylphenyl)-2-allyloxy-3-pyrazinecarboxylic acid
5-(p-methoxyphenyl)-2-benzyloxy-3-pyrazinecarboxylic acid
5-(p-trifluoromethylphenyl)-2-phenoxy-3-pyrazinecarboxylic acid
5-(3,5-dinitrophenyl)-2-methoxy-3-pyrazinecarboxylic acid
5-(4-methylsulfonylphenyl)-2-methoxy-3-pyrazinecarboxylic acid
6-(p-bromophenyl)-2-methoxy-3-pyrazinecarboxylic acid
6-(m-nitrophenyl)-2-propoxy-3-pyrazinecarboxylic acid
6-(3,5-dimethoxyphenyl)-2-vinyloxy-3-pyrazinecarboxylic acid
6-(p-dimethylaminophenyl)-2-benzyloxy-3-pyrazinecarboxylic acid
6-(p-butylthiophenyl)-2-ethoxy-3-pyrazinecarboxylic acid
2-(o-chlorophenyl)-4-methoxy-5-pyrimidinecarboxylic acid
2-(p-nitrophenyl)-4-ethoxy-5-pyrimidinecarboxylic acid
2-(p-fluorophenyl)-4-benzyloxy-5-pyrimidinecarboxylic acid
2-(p-fluorophenyl)-4-allyloxy-5-pyrimidinecarboxylic acid
2-(3,4,5-trimethoxyphenyl)-4-methoxy-5-pyrimidinecarboxylic acid

PREPARATION OF ACYLOXY DERIVATIVES 5-acetoxy-2-(p-fluorophenyl)-4-pyrimidinecarboxylic acid 2 - (p-fluorophenyl)-5-hydroxy-4-pyrimidinecarboxylic acid (3.5 g., 0.015 mole) is treated with acetic anhydride (3.1 g., 0.030 mole) and a catalytic amount of concentrated sulfuric acid (1 drop). The mixture is warmed on the steam-bath, with frequent agitation, for 30 minutes, and then is taken to dryness in vacuo to give 5-acetoxy-2-(p-fluorophenyl)-4-pyrimidinecarboxylic acid.

When 2 - (p-fluorophenyl)-5-hydroxy-4-pyrimidinecarboxylic acid is replaced in the above example by any of the hydroxy carboxylic acids of this invention, the corresponding acetoxy carboxylic acid is prepared. A representative list of these products is shown below.

5-(p-fluorophenyl)-2-acetoxy-3-pyrazinecarboxylic acid
6-(p-fluorophenyl)-2-acetoxy-3-pyrazinecarboxylic acid
2-(p-fluorophenyl)-4-acetoxy-5-pyrimidinecarboxylic acid
5-(o-hydroxyphenyl)-2-acetoxy-3-pyrazinecarboxylic acid
5-(2,4-dimethylphenyl)-2-acetoxy-3-pyrazinecarboxylic acid
5-(p-trifluoromethylphenyl)-2-acetoxy-3-pyrazinecarboxylic acid
5-(p-chlorophenyl)-2-acetoxy-3-pyrazinecarboxylic acid
5-(pentafluorophenyl)-2-acetoxy-3-pyrazinecarboxylic acid
5-(2-nitrophenyl)-2-acetoxy-3-pyrazinecarboxylic acid
5-(3-nitrophenyl)-2-acetoxy-3-pyrazinecarboxylic acid
6-(p-chlorophenyl)-2-acetoxy-3-pyrazinecarboxylic acid
6-(p-dimethylaminophenyl)-2-acetoxy-3-pyrazinecarboxylic acid
6-(p-methoxyphenyl)-2-acetoxy-3-pyrazinecarboxylic acid
6-(p-butylthiophenyl)-2-acetoxy-3-pyrazinecarboxylic acid
2-(3,4-dimethylphenyl)-5-acetoxy-4-pyrimidinecarboxylic acid
2-(p-methylsulfonylphenyl)-5-acetoxy-4-pyrimidinecarboxylic acid
2-(p-chlorophenyl)-5-acetoxy-4-pyrimidinecarboxylic acid
2-(3,4,5-trimethoxyphenyl)-5-acetoxy-4-pyrimidinecarboxylic acid
2-(3,4,5-trimethoxyphenyl)-4-acetoxy-5-pyrimidinecarboxylic acid
2-(p-nitrophenyl)-4-acetoxy-5-pyrimidinecarboxylic acid
2-(2,6-dichlorophenyl)-4-acetoxy-5-pyrimidinecarboxylic acid
2-(m-nitrophenyl)-4-acetoxy-5-pyrimidinecarboxylic acid When acetic anhydride is replaced in the above example by propionic anhydride, butyric anhydride, isobutyric anhydride, valeric anhydride, benzoic anhydride or phenylacetic anhydride, the corresponding acyloxy carboxylic acid is obtained.

PREPARATION OF AMIDES 2-(p-fluorophenyl)-4-hydroxy-5-pyrimidinecarboxamide

5 - carbomethoxy - 2 - (p-fluorophenyl) - 4 - hydroxypyrimidine (2.5 g., 0.010 mole) is refluxed for 1 hour with methanol (5 ml.) and concentrated ammonium hydroxide (15 ml.). Methanol (10 ml.) is added to the hot solution, which is then treated with charcoal, filtered, and chilled thoroughly. 2 - (p-fluorophenyl)-4-hydroxy-5-pyrimidinecarboxamide is collected by filtration, and recrystallized from aqueous alcohol.

When 5 - carbomethoxy - 2-(p-fluorophenyl-4-hydroxypyrimidine of the above procedure is replaced by any of the esters of this invention, the corresponding carboxamide is prepared.

N,N-diethyl 2-(p-fluorophenyl)-4-hydroxy-5-pyrimidinecarboxamide

2 - (p - fluorophenyl) - 4 - hydroxy-5-pyrimidinecarboxylic acid (3.5 g., 0.015 mole) is added gradually to a refluxing solution of thionyl chloride (3.6 g., 0.03 mole) in benzene (15 ml.). When the addition is complete, refluxing is continued for 30 minutes.

The mixture is allowed to cool, and to it is added a solution of diethylamine (1.3 g., 0.018 mole) in benzene (15 ml.). The mixture is stirred thoroughly, warmed briefly on the steam-bath, and chilled, N,N-diethyl 2-(p-fluorophenyl)-4-hydroxy-5-pyrimidinecarboxamide is collected, and purified by recrystallization from aqueous alcohol.

When 2 - (p - fluorophenyl) - 4 - hydroxy-5-pyrimidinecarboxylic acid of the above procedure is replaced by any of the carboxylic acids of this invention, the corresponding N,N-diethylcarboxamide is prepared.

When the diethylamine of the above example is replaced by other appropriate primary or secondary amines such as methylamine, ethylamine, methylethylamine, benzylamine, aniline, dimethylamine, dipropylamine, cyclopropylamine, cyclohexylamine, dibenzylamine, piperidine, morpholine, piperazine, homopiperazine or pyrrolidine, the corresponding amide is prepared. A representative list of amides thus prepared is shown below.

5-(p-fluorophenyl)-2-hydroxy-3-pyrazinecarboxamide
5-(p-fluorophenyl)-2-acetoxy-3-pyrazinecarboxamide
N,N-dimethyl-5-(p-chlorophenyl)-2-methoxy-3-pyrazinecarboxamide
N-piperazino-5-(2,4-dimethylphenyl)-2-hydroxy-3-pyrazinecarboxamide
N-ethyl-5-(p-methoxyphenyl)-2-hydroxy-3-pyrazinecarboxamide
6-(p-fluorophenyl)-2-hydroxy-3-pyrazinecarboxamide
N,N-diethyl 6-(p-fluorophenyl)-2-acetoxy-3-pyrazinecarboxamide
N-morpholino 6-(p-nitrophenyl)-2-hydroxy-3-pyrazinecarboxamide
N-cyclopropyl 6-(p-methylphenyl)-2-ethoxy-3-pyrazinecarboxamide
N-benzyl 6-(p-chlorophenyl)-2-hydroxy-3-pyrazinecarboxamide
2-(p-fluorophenyl)-5-hydroxy-4-pyrimidinecarboxamide
2-(o-chlorophenyl)-5-acetoxy-4-pyrimidinecarboxamide
N,N-dimethyl 2-(p-dimethylaminophenyl)-5-methoxy 4-pyrimidinecarboxamide
N-phenyl 2-(p-nitrophenyl)-5-hydroxy-4-pyrimidinecarboxamide
N-piperazino 2-(3,4,5-trimethoxyphenyl)-5-acetoxy-4-pyrimidinecarboxamide
2-(2,6-dichlorophenyl)-5-benzyloxy-4-pyrimidinecarboxamide
2-(p-methylthiophenyl)-5-hydroxy-4-pyrimidinecarboxamide
N-methyl 2-(p-fluorophenyl)-4-acetoxy-5-pyrimidinecarboxamide
N,N-dibenzyl 2-(p-fluorophenyl)-4-hydroxy-5-pyrimidinecarboxamide
2-(p-methylsulfonylphenyl)-4-propoxy-5-pyrimidinecarboxamide
N-pyrrolidino 2-(3,4-dimethylphenyl)-4-phenoxy-5-pyrimidinecarboxamide
2-(p-fluorophenyl)-4-hydroxy-5-pyrimidinecarboxamide

PREPARATION OF SALTS

Sodio 6-(p-fluorophenyl)-2-hydroxy-3-pyrazinecarboxylate

To a solution of 0.001 mole of sodium hydroxide in 15 ml. of water is added 0.001 mole of 6-(p-fluorophenyl)-2-hydroxy-3-pyrazinecarboxylic acid in 10 ml. of ethanol. The mixture is stirred and heated for two hours and evaporated in vacuo to obtain sodio 6-(p-fluorophenyl)-2-hydroxy-3-pyrazinecarboxylate.

When one equivalent of potassium hydroxide, lithium carbonate, aluminum hydroxide, sodium carbonate or calcium hydroxide are used in place of sodium hydroxide the corresponding salt is prepared.

When the 6 - (p-fluorophenyl)-2-hydroxy-3-pyrazinecarboxylic acid of the above procedure is replaced by any of the carboxylic acid compounds of this invention, the corresponding salt is prepared.

When two equivalents of the above bases are used in the above examples, the corresponding di-salt is prepared.

The following representative examples illustrate the interconversion or introduction of functional groups which can be accomplished at various stages of the preparation of the final products.

Methyl 6-(o-hydroxyphenyl)-2-hydroxy-3-pyrazinecarboxylate

A mixture of methyl 6-(o-aminophenyl)-2-hydroxy-3-pyrazinecarboxylate (0.2 mole), water (600 ml.) and concentrated sulfuric acid (25 ml.) is cooled to 10° C. and a solution of sodium nitrite (0.21 mole) in a minimum of water is added gradually. When the presence of free nitrous acid is detected (starch-iodide paper), the addition is stopped and the diazotization mixture is allowed to warm to room temperature, then heated on a steam-bath until there is no more nitrogen evolution. The mixture is cooled, extracted well with chloroform, the combined chloroform layer dried, concentrated to a residue, methanol (300 ml.) added plus 0.5 ml. concentrated sulfuric acid, the mixture heated gently for several hours, the mixture concentrated in vacuo to remove most of the methanol, the residue partitioned between chloroform-dilute sodium bicarbonate solution, the chloroform layer dried, filtered and concentrated to a residue. Chromatography of the residue on a silica gel column using an ether-petroleum ether (v.v. 0–100% ether) system as eluant yields methyl 6-(o-hydroxyphenyl)-2-hydroxy-3-pyrazinecarboxylate.

Methyl 5-(p-aminophenyl)-2-hydroxy-3-pyrazinecarboxylate

A mixture of pure methyl 5-(p-nitrophenyl)-2-hydroxy-3-pyrazinecarboxylate (0.01 mole) in methanoldioxane (1:1) (ca. 200 ml.) is reacted with hydrogen at room temperature (40 p.s.i.) in the presence of 10% Pd/C (1.0 g.). The mixture is filtered, the cake washed well with methanol, the filtrate evaporated in vacuo, the residue chromatographed on a silica gel column using a methanol-methylene chloride system (v./v. 0–30% methanol) as eluant to yield methyl 5-(p-aminophenyl)-2-hydroxy-3-pyrazinecarboxylate.

Methyl 2-(p-methylthiophenyl)-4-hydroxy-5-pyrimidinecarboxylate

A mixture of methyl 2-(p-mercaptophenyl)-4-hydroxy-5-pyrimidinecarboxylate (0.01 mole) in a deaerated aqueous KOH solution (0.01 mole) is treated with dimethylsulfate (0.012 mole) at room temperature over one hour, the mixture acidified, extracted well with ether, and the dried ether extracts chromatographed on a silica gel column using an ether-petroleum ether system (v./v. 0–30% ether) as eluant yielding methyl 2-(p-methylthiophenyl)-4-hydroxy-5-pyrimidinecarboxylate.

2-(p-Methylsulfinylphenyl)-5-acetoxy-4-pyrimidinecarboxylic acid

To an ice-cooled solution of 2-(p-methylthiophenyl)-5-acetoxy - 4 - pyrimidinecarboxylic acid (0.01 mole) in methanol-acetone is added a solution of sodium metaperiodate (0.01 mole) in a minimum of water, and the mixture stirred at 0–8° C. until precipitation of sodium iodate is completed. The iodate is removed by filtration, the solvents removed in vacuo, and the residue taken up in chloroform and ether. The combined organic extracts are dried, filtered and concentrated. Purification of the 2-(p-methylsulfinylphenyl) - 5 - acetoxy-4-pyrimidinecarboxylic acid is affected via recrystallization or chromatography (silica gel) of its methyl ester.

We claim:
1. A compound of the formula:

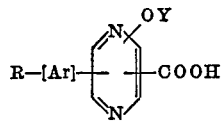

or a non-toxic pharmaceutically acceptable salt thereof, wherein —OY and —COOH are ortho to each other; and wherein

[Ar] is phenyl containing one or more substituents; wherein

R is $C_{1-4}$ alkyl, chloro, bromo, fluoro, trifluoromethyl, hydroxy, $C_{1-2}$ alkoxy, nitro, dimethylamino, $C_{1-4}$ alkylthio, or $C_{1-2}$ alkylsulfonyl; and Y is hydrogen or acetyl.

2. The compound of claim 1, with structural formula

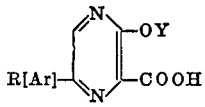

3. The compound of claim 1 with structural formula

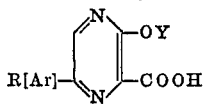

4. A compound according to claim 2 which is 2-(p-fluorophenyl)-5-hydroxy-6-pyrazinecarboxylic acid.

5. A compound according to claim 2 which is 2-(p-fluorophenyl)-5-acetoxy-6-pyrazinecarboxylic acid.

6. A compound according to claim 3 which is 2-(p-fluorophenyl)-6-hydroxy-5-pyrazinecarboxylic acid.

7. A compound according to claim 3 which is 2-(p-fluorophenyl)-6-acetoxy-5-pyrazinecarboxylic acid.

References Cited

UNITED STATES PATENTS

| | | | |
|---|---|---|---|
| 3,472,848 | 10/1969 | Cragoe et al. | 260—250 R |
| 3,573,306 | 3/1971 | Shepard et al. | 260—250 R |
| 3,575,975 | 4/1971 | Cragoe et al. | 260—250 R |

NICHOLAS S. RIZZO, Primary Examiner

U.S. Cl. X.R.

424—250; 260—251, 256.4, 256.5

UNITED STATES PATENT OFFICE
CERTIFICATE OF CORRECTION

Patent No. 3,745,161　　　　　　　Dated  July 10, 1973

Inventor(s) Tsung-Ying Shen, Gordon L. Walford & Bruce E. Witzel

It is certified that error appears in the above-identified patent and that said Letters Patent are hereby corrected as shown below:

Column 19, line 1, "one or more substituents" should read -- one or more R substituents -- .

Column 19, Claim 3, correct the structural formula, from

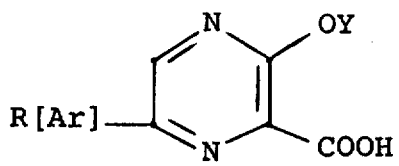　　to　　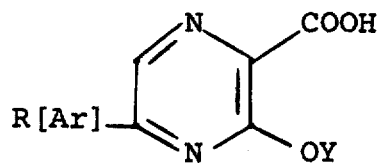

Signed and sealed this 9th day of April 1974.

(SEAL)
Attest:

EDWARD M. FLETCHER, JR.　　　　　　C. MARSHALL DANN
Attesting Officer　　　　　　　　　Commissioner of Patents